United States Patent [19]

Fancy et al.

[11] Patent Number: 5,452,085
[45] Date of Patent: Sep. 19, 1995

[54] SPECTROGRAPHIC ASTIGMATISM CORRECTION SYSTEM

[75] Inventors: Robert D. Fancy, West Boylston; Michael A. Case, Acton, both of Mass.

[73] Assignee: Acton Research Corporation, Acton, Mass.

[21] Appl. No.: 970,378

[22] Filed: Jan. 27, 1993

[51] Int. Cl.[6] .............................................. G01J 3/28
[52] U.S. Cl. ................................. 356/326; 356/328
[58] Field of Search ............................ 356/318–319, 356/326, 328

[56] References Cited

U.S. PATENT DOCUMENTS

| | | | |
|---|---|---|---|
| 4,707,056 | 11/1987 | Bittner | 356/326 |
| 4,726,680 | 2/1988 | Allington | 356/319 |
| 5,066,127 | 11/1991 | Schwenker | 356/328 |
| 5,257,085 | 10/1993 | Ulich et al. | 356/73 |

*Primary Examiner*—Vincent P. McGraw
*Assistant Examiner*—K. P. Hantis
*Attorney, Agent, or Firm*—James H. Grover

[57] ABSTRACT

An optical input system for correcting astigmatism introduced by off-axis reflectors in a spectrograph includes an aspheric mirror producing a correcting factor which compensates for the spectrograph distortions and enables the spectrograph to produce multiple astigmatic light images at its two-dimensional charge-coupled-device output.

18 Claims, 2 Drawing Sheets

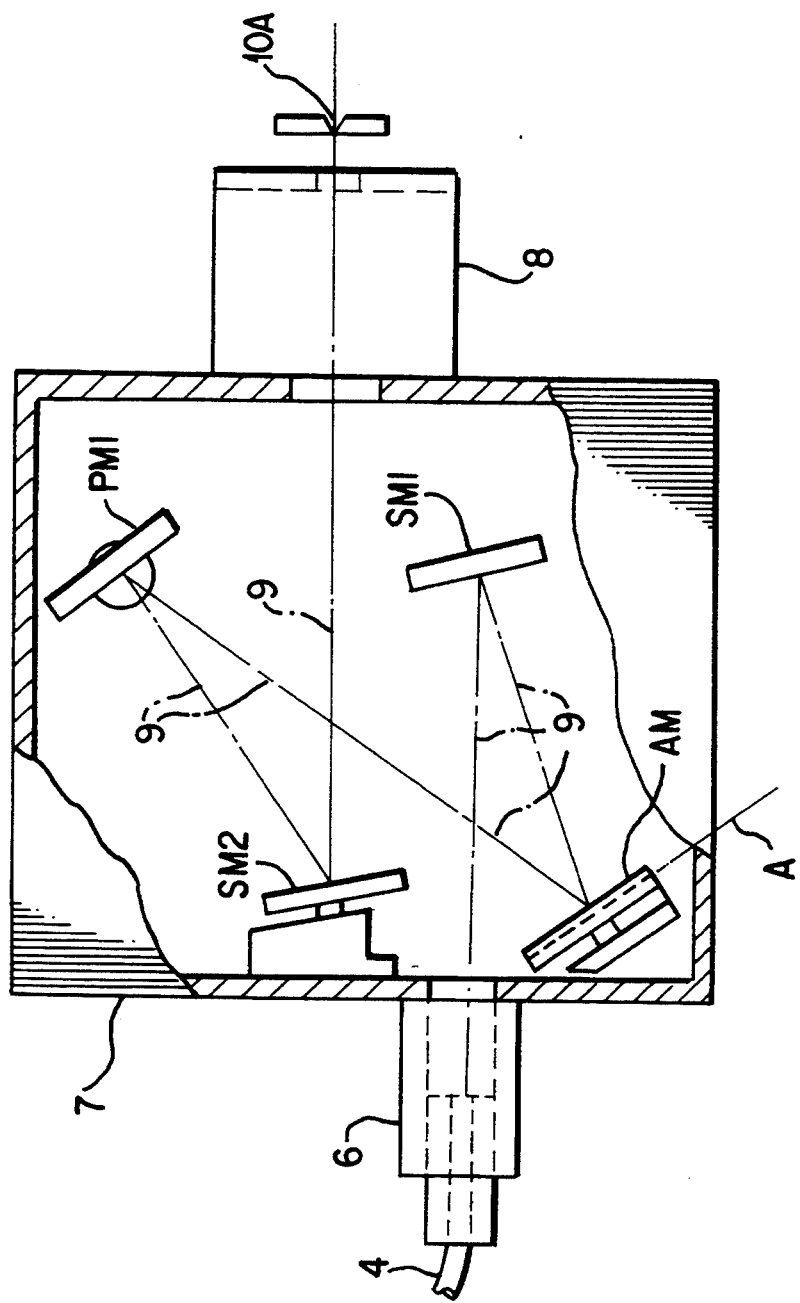

SPECTROGRAPHIC ASTIGMATISM CORRECTION SYSTEM

BACKGROUND OF THE INVENTION

The present invention relates to spectrographic instruments such as monochromators, and particularly to a system for correcting astigmatism in such instruments which include spherical off-axis reflectors.

Many spectrographic instruments for dispersing ultraviolet and other electromagnetic light spectra, for example the Czerny-Turner monochromator, include a diffraction grating and one or more spherical reflectors for directing a light beam on a folded path from a light entrance slit to the grating and thence to a light exit slit. Because the reflectors would direct the light back to the light source if it were aligned with their optical axes, the path must be directed to the reflectors at an angle away from each reflector axis. Such off axis reflectors inherently impart astigmatic distortion to the diffracted light image such that the light image at the exit slit is a line rather than a point. With a single light beam at the spectrograph light input a linear spectral image at the output slit can be sensed satisfactorily with a single photodetector. But there is a growing need for simultaneous analysis of spectra of several different point or spot light sources dispersed onto discrete minute areas of a two-dimensional (2D) charge-coupled-device (CCD). Such a spectrometer is described in the article "CCD detectors record multiple spectra simultaneously", Nir and Talmi", *LASER FOCUS WORLD*, August 1991, 111-119. But the astigmatic line image from a typical monochromator or other off-axis spectrographs tends to overlap several of the minute cells in a 2D CCD blurring the output signals of the CCD even though the several light sources are coupled to the spectrograph entrance slit through separate optical fibers.

One attempt to compensate for the inherent stigmatism of an off-axis spectrograph appears in U.S. Pat. No. 4,932,768 to Gobeli, and involves replacing two of the off-axis reflectors within the spectrograph with mechanically distortable spherical mirrors. Such distortion requires extremely delicate mechanical adjustment of a critical element in the spectrographic optics, with the possibility of misadjustment to which a normal glass reflector of fixed curvature is not subject.

Other systems using CCDs are shown in *Photonics Spectra*, March 1992, page 55; and *Spectroscopy*, February, 1991, Vol. 6, No. 2, page 61. These systems produce low quality images however.

Accordingly it is the object of this invention to provide a system compensating for the inherent astigmatism of a spectro-graph with off-axis reflectors, which does not alter the optics of the spectrograph, and which is particularly useful for simultaneous detection of multiple spectra with a two-dimensional charge-coupled-device at the spectrograph output slit.

SUMMARY OF THE INVENTION

According to the invention a spectral image correction system for coupling to a spectrograph with an off-axis reflector has a light input and output optical coupled by reflection optics including an aspheric reflector such as a concave, cylindrical mirror. The system may have a plurality of light inputs through optical fibers and multiple stigmatic light outputs, and is adapted to be optically coupled to a spectrograph with an off-axis reflector such as a monochromator having a two-dimensional charge-coupled-device at its outputs coupled to a display or recorder.

DRAWINGS

FIG. 3 is a plan view of the correction system, partly broken away.

DESCRIPTION

Figure 1:
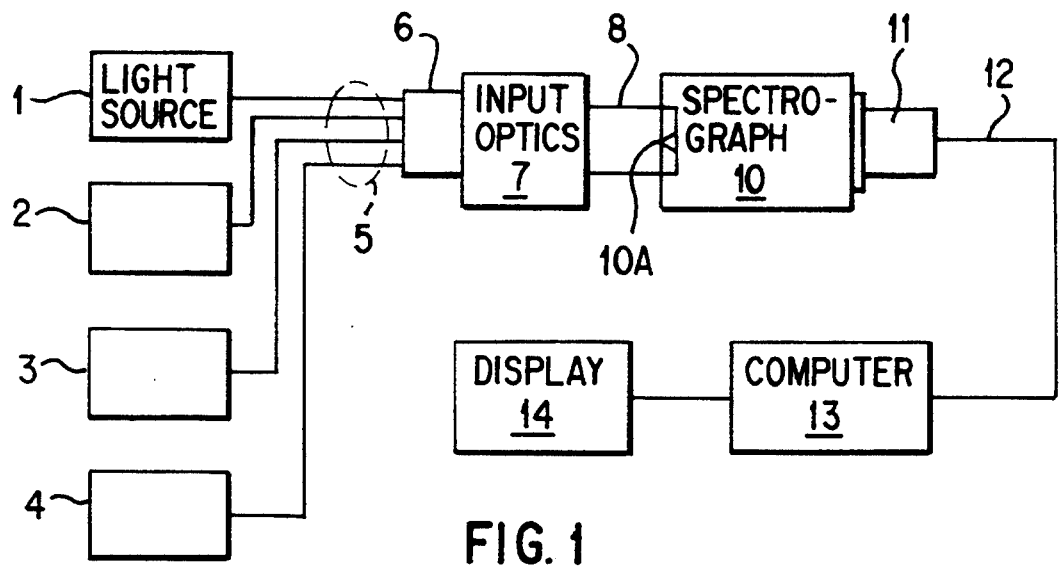
FIG. 1 is a schematic diagram of the present correction system in combination with spectrographic apparatus.

FIG. 1 shows schematically four light sources 1 to 4 individually coupled by a bundle of optical fibers 5 to the entrance slit assembly 6 of input optics 7 which comprises the astigmatism correction system of the present invention. Fewer or more light sources may be used. The output of the input optics 7 is coupled through a tube 8 to the entrance slit 10A of a spectrometer 10 which disperses spectra of each of the four light sources onto different areas of a two-dimensional charge-coupled-device 11. Electrical signals corresponding to the four individual spectra are generated by the CCD and conducted through connecting channels 12 to a data processing computer 13. The computer stores, digitizes and processes the signals for application to a display 14 such as a cathode ray tube or graphic printer.

Figure 2:
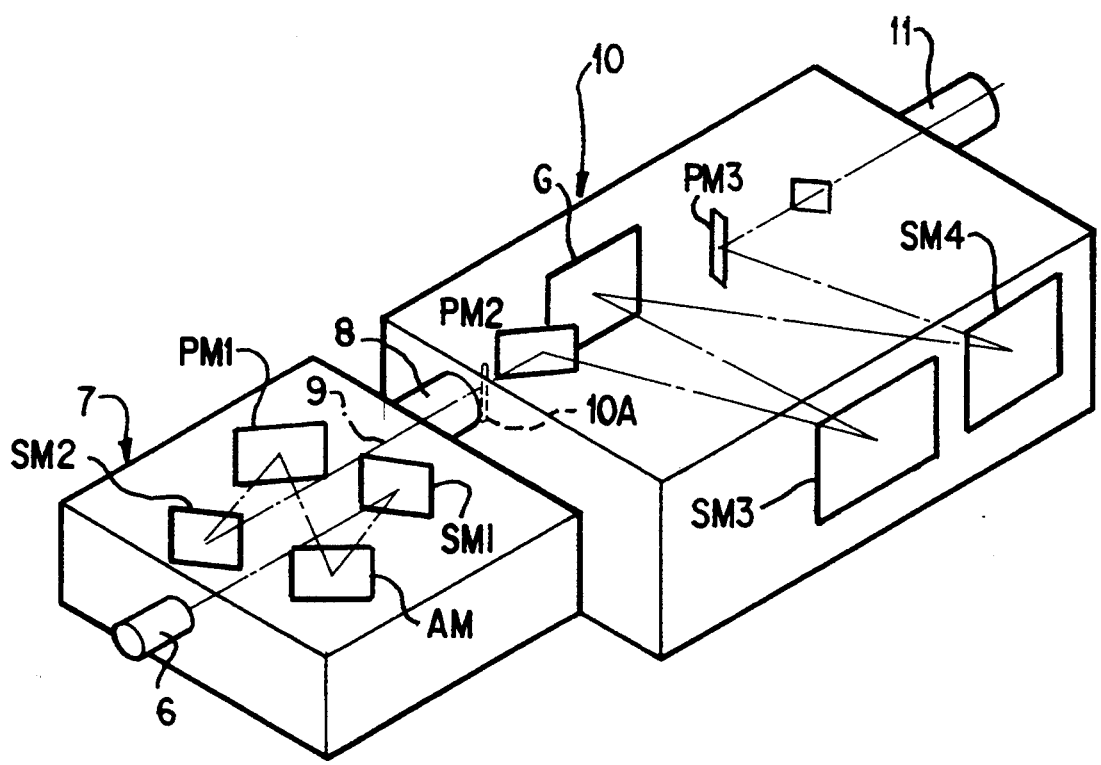
FIG. 2 is an isometric view of the correction system coupled to a spectrograph.

As shown in FIG. 2 the input optics 7 and spectrograph optics 10 are enclosed in housings connected by the coupling tube 8. A single housing can be used for both sets of optics, but preferably the input optics 7 are separately housed so that they can be coupled to different spectrographs. From the entrance port assembly 6 the input light beams are directed from point or spot images at the ends of optical fibers to the tube 8 along a path 9 folded by four reflectors. As shown also in FIG. 3, the four reflectors include, in order, a first spherical mirror SM1, an aspheric mirror AM, a plane mirror PM, and a second spherical mirror SM2. As an example of an imaging spectrograph, the typical Czerny-Turner monochromator 10 in FIG. 2 comprises a first plane mirror PM2, a first spherical mirror SM3, a grating G, a second spherical mirror SM4, and a second plane mirror PM3 reflecting multiple dispersed spectra to the 2D CCD 11. The spherical mirrors SM1 and SM2 are off-axis reflectors inherently introducing astigmatic distortion in the multiple images at the focal plane of the output CCD.

Within the input optics system 7 of FIGS. 2 and 3 the path to all four reflectors is off the central optical axis of each mirror normal to its center point, and the image at the exit slit would normally be astigmatically distorted.

According to the present invention, however, the aspheric mirror AM has a concave cylindrical component which corrects off-axis astigmatism not only in the input optics 7, but also in the spectrograph 10. The mirrors in input optics for a half meter spectrograph, for example, are optical glass blocks four to five centimeters square, and the aspheric mirror AM has a concave cylindricity with a radius of 2975 millimeters about a horizontal axis A in the plan view of FIG. 2.

The present input optics correction system in combination with a spectrograph not only accepts multiple light images at its input for simultaneous detection by a two-dimensional charge-coupled-device at the output of the spectrograph, but further modifies the spectral input to the spectrograph so as to compensate for off-axis astigmatic distortion in the spectrograph with a stigmatic correction factor the converse of the spectrograph distortion. The correction system enables the spectrograph to produce a stigmatic spectral output image with exceptional separation and high resolution of the multiple spectra.

It should be understood that the present disclosure is for the purpose of illustration only, and that the invention includes all modifications and equivalents falling within the appended claims.

We claim:

1. A spectral image correction system adapted for optical coupling to the spectral input of an external spectrograph which has an off-axis reflector causing stigmatic distortion at the spectrograph spectral output, the correction system comprising:
   a spectral light source;
   a spectral light entrance receiving light from the source, and a spectral light output at a light imaging position beyond the light entrance; and
   reflecting means optically coupling the spectral light entrance and spectral light output;
   wherein the reflecting means includes an aspheric mirror between the spectral light entrance and spectral light output, the aspheric mirror being spaced from the light imaging position so as to impart to the spectral light at the imaging position a stigmatic correction factor the converse of the off-axis distortion of the spectrograph, thereby enabling the external spectrograph to produce an undistorted stigmatic spectral output image.

2. A system according to claim 1 wherein the reflecting means comprises a cylindrical mirror.

3. A system according to claim 2 wherein the cylindrical mirror is concave.

4. A system according to claim 1 wherein the correction system has a plurality of light entrances.

5. A system according to claim 1 wherein the correction system has a plurality of stigmatic light image entrances.

6. A system according to claim 1 wherein the light image entrance includes a plurality of optical fibers.

7. A system according to claim 1 wherein the output is a plurality of stigmatic light images.

8. A system according to claim 5 wherein the output is a plurality of stigmatic light images.

9. A system according to claim 1 including a folded light path between the spectral light entrance and spectral light output defined by the following order of mirrors: a spherical mirror, an aspheric mirror, a plane mirror and a spherical mirror.

10. A system according to claim 1 enclosed in a vacuum housing.

11. A system according to claim 1 in combination with a spectrograph with an off-axis reflector.

12. A combination according to claim 11 including an optical coupling between the correction system and the spectrograph.

13. A combination according to claim 11 wherein the spectrograph is an imaging spectrograph.

14. A combination according to claim 11 wherein the spectrograph is a monochromator.

15. A combination according to claim 11 wherein the correction system has a multiple light image input and the spectrograph has a stigmatically corrected multiple spectral output at a focal plane.

16. A combination according to claim 15 including a two-dimensional array of charge coupled detectors at the spectrograph output receiving the stigmatically corrected multiple spectral output and producing electric signals corresponding to the multiple spectra.

17. A combination according to claim 16 including a multiple image display, and means coupling the detector array to the display.

18. A combination according to claim 17 wherein the display is a cathode ray tube and the coupling means is a data processor with means for digitizing and processing the electric signals for display.

* * * * *